(12) United States Patent
Conrad et al.

(10) Patent No.: US 9,243,906 B1
(45) Date of Patent: Jan. 26, 2016

(54) AUTOMATED BAROMETRIC PRESSURE SETTING SYSTEM AND RELATED METHOD

(71) Applicants: Joel A. Conrad, Cedar Rapids, IA (US); Steven R. Miller, Cedar Rapids, IA (US)

(72) Inventors: Joel A. Conrad, Cedar Rapids, IA (US); Steven R. Miller, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 81 days.

(21) Appl. No.: 14/279,574

(22) Filed: May 16, 2014

(51) Int. Cl.
*G01C 5/06* (2006.01)

(52) U.S. Cl.
CPC .......................................... *G01C 5/06* (2013.01)

(58) Field of Classification Search
None
See application file for complete search history.

(56) References Cited

U.S. PATENT DOCUMENTS

| | | | | |
|---|---|---|---|---|
| 3,936,797 A * | 2/1976 | Andresen, Jr. | ......... | G01C 5/005 340/815.78 |
| 4,021,009 A * | 5/1977 | Baker | ................... | G05D 1/0607 244/180 |
| 6,381,540 B1 * | 4/2002 | Beason | ..................... | G01C 5/06 342/120 |
| 6,522,298 B1 * | 2/2003 | Burgett | ..................... | G01C 5/06 342/357.25 |
| 7,778,745 B2 * | 8/2010 | Conner | ..................... | G01C 5/06 342/29 |
| 8,416,100 B2 * | 4/2013 | Azoulai | ................. | G01C 5/005 340/945 |
| 8,725,322 B2 * | 5/2014 | Botargues | .............. | G01C 5/005 701/10 |
| 2004/0056895 A1 * | 3/2004 | Hedrick | .............. | G06F 3/04847 715/764 |
| 2004/0186635 A1 * | 9/2004 | Manfred | .............. | G01C 25/005 701/4 |
| 2008/0195263 A1 * | 8/2008 | Shehi | ..................... | G01C 5/005 701/4 |

* cited by examiner

*Primary Examiner* — Thomas Tarcza
*Assistant Examiner* — Richard Goldman
(74) *Attorney, Agent, or Firm* — Angel Gerdzhikov; Donna Suchy; Daniel Barbieri

(57) ABSTRACT

A system and related method is disclosed for automated setting of a barometric altimeter onboard an aircraft. The system may receive inputs from a plurality of integrated systems and, based on those inputs, automatically set the barometric altimeter to the proper setting for safe operation of the aircraft. Recognition of a voice command from an onboard operator as well as from an offboard source, and parsing of received METAR reports coupled with positioning information may form the basis of the integrated inputs. Once the barometric altimeter is automatically set, the system notifies the crewmember of the new barometric altimeter setting.

20 Claims, 10 Drawing Sheets

AUTOMATED BAROMETRIC PRESSURE SETTING SYSTEM AND RELATED METHOD

FIELD OF THE INVENTIVE CONCEPTS

The inventive concepts disclosed herein relate generally to altimetry and methods for accurate barometric altimetry. More particularly, but not by way of limitation, embodiments of the inventive concepts disclosed herein relate to a system and related method for automated barometric altimetry setting without a requirement for traditional pilot physical action.

BACKGROUND

Barometric altimetry is the standard by which air traffic maintains vertical separation. Above a transition altitude, each aircraft is required to maintain a standard altimeter setting to ensure adequate separation. Below a transition level, each aircraft is required to maintain a local setting in the altimeter to 1) maintain separation from other aircraft, and 2) accurately maintain clearance above surface obstacles.

Traditional barometric altimetry requires pilot action in this transition between the standard setting (e.g., 29.92 inches mercury (inHg)) and the local setting (e.g. QNH, QNE). The pilot must reach to the instrument panel and physically twist a knob to the desired setting. Passing this transition, the pilot must set the proper setting in the altimeter (climbing set to standard 29.92, descending set to local). This pilot action must be timely at the transition altitude and transition level since a level off at an altitude just after passing the transition may be required. In some cockpits, a Z axis of a knob (a push of the knob) may set the altimeter to a standard setting of 29.92.

Traditional barometric systems may utilize 1) air data system, 2) flight displays, and 3) a barometric altimeter adjustment knob with manual pilot action to set the desired barometric pressure.

Transition altitudes and transition levels vary throughout the world. For example, in the US, transition altitude (climbing) is 18,000 feet Mean Sea Level (MSL) while the transition level (descending) is Flight Level (FL) 180. In the Netherlands, however, transition altitude is 3,000 ft. MSL while transition level is FL40. Operating in Beijing, China, the transition level is FL118 while the transition altitude is 9850 ft. MSL.

Without experience in these theaters of operation, a pilot may be unfamiliar with current altimetry requirements. Single piloted aircraft require continuous attention to detail where altimetry may fall out of the scan pattern of a task saturated pilot. An error in altimetry setting may possibly reduce a desired margin of safety.

Upgraded avionics displays may require/demand less mechanical input. A display system designed for pilots in a flight deck requiring a mechanical pilot input may be less economical. In addition, a mechanical device may be prone to failure since miniature gears and dials may fail over time.

Although traditional federated systems may share information, they may lack an ability to fully integrate a device and may not allow two-way communications between the integrated device and the system as a whole.

Therefore, a need remains for a system and related method to automate the setting of the barometric altimeter, so that human error and mechanical requirements are minimized. Further, a system and related method to automate the setting of the barometric altimeter to allow a reduction in pilot workload an increase in safety, and an elimination of a dedicated flight deck knob is desired.

SUMMARY

Accordingly, a preferred embodiment of the inventive concepts disclosed herein is directed to an integrated system for automated barometric altimeter setting, comprising: an air data system integrated within the integrated system, the air data system configured for transmitting an air data input, the air data input representative of at least one of: a pressure altitude, an airspeed, a temperature, and a generated altitude, a positioning system integrated within the integrated system, the positioning system configured for determining a three dimensional position based at least on: a global navigation satellite signal and the air data input, a weather information system integrated within the integrated system, the weather information system configured for: receiving at least one weather message, determining a proximal weather message from the at least one weather message, the determining based on the three dimensional position, and transmitting a local altimeter input, the local altimeter input based on the proximal weather message, a memory configured for storing at least one rules set, the at least one rules set determinative of a local altimetry procedure, an integrated avionics system operably coupled with the air data system, the positioning system, the weather information system, and the memory, the integrated avionics system configured for: receiving the air data input, receiving the local altimeter input, receiving the three dimensional position, and determining a current barometric altimeter setting based on the air data input, the local altimeter input, the three dimensional position, and the rules set, the current barometric altimeter setting being one of: a standard barometric altimeter setting and a local barometric altimeter setting, applying the current barometric altimeter setting to at least one avionics application, and generating an alert, and transmitting the alert to a crew alerting system configured for presenting the alert to a crewmember.

An additional embodiment of the inventive concepts disclosed herein is directed to a system wherein the current barometric altimeter setting is further based on one of: a voice command received from an operator, a voice transmission received from an offboard source, and a signal received via a data link.

An additional embodiment of the inventive concepts disclosed herein is directed to a system wherein the air data input is received via one of: an onboard pitot-static system, and a signal received via a data link and wherein the weather message is one of: a METAR message, an hourly observation message, and an automated weather observation reporting system message.

An additional embodiment of the inventive concepts disclosed herein is directed to a system wherein the positioning system is one of: a global navigation satellite system, and an onboard inertial system and wherein the current barometric altimeter setting is established via an operator override executed by an operator.

An additional embodiment of the inventive concepts disclosed herein is directed to a system wherein the at least one avionics application is one of: a primary flight display, an altimeter display, and an altitude alerting system.

An additional embodiment of the inventive concepts disclosed herein is directed to a method for automated barometric altimetry, comprising: receiving an air data input, the air data input generated by an air data system configured for transmitting the air data input, the air data input representative of at least one of: a pressure altitude, an airspeed, a temperature, and a generated altitude, receiving a three dimensional position via a positioning system, the positioning system configured for determining the three dimensional position based at least on: a global navigation satellite signal, and the air data input, receiving a local altimeter input via a weather information system, the weather information system configured for: receiving at least one weather message, determining a proximal weather message from the at least one weather message, the determining based on the three dimensional position, and transmitting the local altimeter input, the local altimeter input based on the proximal weather message, storing at least one rules set within a memory, the at least one rules set determinative of a local altimetry procedure, determining a current barometric altimeter setting based on the air data input, the local altimeter input, the three dimensional position, and the rules set, the current barometric altimeter setting being one of: a standard barometric altimeter setting and a local barometric altimeter setting, applying the current barometric altimeter setting to at least one avionics application, generating an alert, and displaying the alert to a crewmember on a display.

An additional embodiment of the inventive concepts disclosed herein is directed to a computer readable medium having non-transitory computer readable program code embodied therein for automated barometric altimetry, the computer readable program code comprising instructions which, when executed by a computer device or processor, perform and direct the steps of: receiving an air data input, the air data input generated by an air data system configured for transmitting the air data input, the air data input representative of at least one of: a pressure altitude, an airspeed, a temperature, and a generated altitude, receiving a three dimensional position via a positioning system, the positioning system configured for determining the three dimensional position based at least on: a global navigation satellite signal, and the air data input, receiving a local altimeter input via a weather information system, the weather information system configured for: receiving at least one weather message, determining a proximal weather message from the at least one weather message, the determining based on the three dimensional position, and transmitting the local altimeter input, the local altimeter input based on the proximal weather message, storing at least one rules set within a memory, the at least one rules set determinative of a local altimetry procedure, determining a current barometric altimeter setting based on the air data input, the local altimeter input, the three dimensional position, and the rules set, the current barometric altimeter setting being one of: a standard barometric altimeter setting and a local barometric altimeter setting, applying the current barometric altimeter setting to at least one avionics application, generating an alert, and displaying the alert to a crewmember on a display.

An additional embodiment of the inventive concepts disclosed herein is directed to a method for automated setting of a position based performance parameter, comprising: receiving at least one three dimensional position, the at least one three dimensional position being one of: a geographical three dimensional position, an expected geographical three dimensional position, an altitude, and a geographic boundary, receiving at least one local position based performance parameter, the at least one local position based performance parameter applicable proximal to the at least one three dimensional position, the at least one local position based performance parameter generated to ensure separation between a first vehicle and at least one of: a second vehicle, an obstacle, and a terrain proximal to the first vehicle, each of the first and second vehicle proximal to the at least one three dimensional position, receiving a first vehicle current position, determining a correlation between the first vehicle current position and the at least one three dimensional position, setting the position based performance parameter based on the correlation, and displaying the set position based performance parameter to an operator of the first vehicle.

An additional embodiment of the inventive concepts disclosed herein is directed to a method wherein the position based performance parameter is set based on one of: a voice command received from an operator, a signal received via a data link, and an altimeter setting received from an air traffic controller.

An additional embodiment of the inventive concepts disclosed herein is directed to a method wherein the at least one local position based performance parameter is one of: a speed, a configuration, a communications procedure, and a change in performance.

An additional embodiment of the inventive concepts disclosed herein is directed to a method wherein the at least one three dimensional position is based on one of: a global navigation satellite system, and an onboard inertial system.

An additional embodiment of the inventive concepts disclosed herein is directed to a method wherein the position based performance parameter is established via an operator override executed by an operator.

It is to be understood that both the foregoing general description and the following detailed description are exemplary and explanatory only and are not necessarily restrictive of the inventive concepts disclosed and claimed herein. The accompanying drawings, which are incorporated in and constitute a part of the specification, illustrate embodiments of the inventive concepts disclosed herein and together with the general description, serve to explain the principles of the inventive concepts disclosed herein.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the presently preferred embodiments of the inventive concepts disclosed herein, examples of which are illustrated in the accompanying drawings.

The following description presents certain specific embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

Embodiments of the inventive concepts disclosed herein may provide for a system and related method for automated setting of a barometric altimeter onboard an aircraft. The system may receive inputs from a plurality of integrated systems and, based on those inputs, automatically set the barometric altimeter to the proper setting for safe operation of the aircraft.

To simplify the workload of the flight deck crew, embodiments of the inventive concepts disclosed herein may provide for an integrated system comprising 1) weather information, 2) crew alerting system (CAS) information, in addition to 3) air data system information, 4) flight displays, 5) position information (GPS/IRS) and 6) barometric altimeter (BARO) setting to enable automated, accurate, and timely input of the proper BARO setting.

As opposed to a federated system, embodiments of the inventive concepts disclosed herein may provide an integrated approach to automated barometric pressure setting in the flight deck.

Overview

Figure 1:
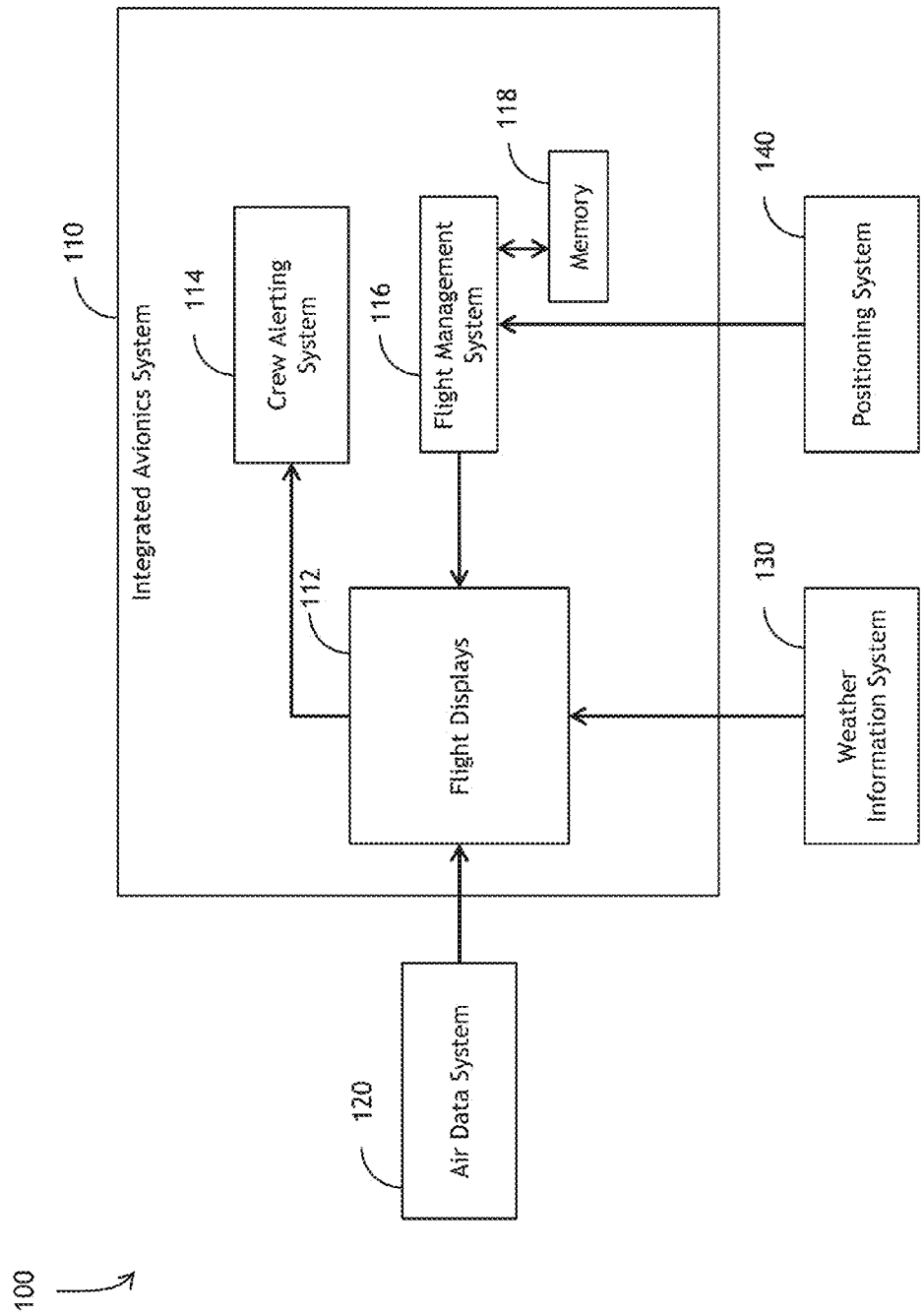
FIG. 1 is a diagram of an automated BARO system exemplary of an embodiment of the inventive concepts disclosed herein.

Referring to FIG. 1, a diagram of an automated BARO system exemplary of an embodiment of the inventive concepts disclosed herein is shown. Embodiments of the inventive concepts disclosed herein may comprise an integrated avionics system 110 receiving inputs from one or more or from a plurality of sources and, based on the inputs, generating a BARO setting and applying the generated BARO setting to the avionics systems.

Inputs to the integrated avionics system 110 may include an air data system 120. The air data system 120 may include pitot-static elements as well as accelerometers, temperature sensors, and gyroscope systems. In addition, an Inertial Reference Unit (IRU) may be incorporated in the air data system 120 to add validity and accuracy to inputs from the air data system 120.

Additionally, a weather information system 130 may provide a source for input to the integrated avionics system 110. In one embodiment, the weather information system 130 may receive Meteorological Terminal Aviation Routine Weather Report (METAR), Hourly Observations (OBS), and/or Aviation Weather Observation System (AWOS) input from a proximal station. The METAR/OBS/AWOS data may be of standard format and the weather information system 130 and/or the integrated avionics system 110 may parse any desired information from a standard format.

An additional source for input to the integrated avionics system 110 may include a positioning system 140. Positioning systems 140 employed herein may include a global navigation satellite system (GNSS) including the various satellite based positioning systems deployed around the world. The positioning system 140 may provide input to the integrated avionics system 110 through a flight management system (FMS) 116. The FMS 116 may operate to aid the flight crew in navigation and routing of the aircraft.

In some embodiments, the positioning system 140 may input a current position of the aircraft to the system 100 as well as a future planned position and an expected position based on a flight plan. For example, the positioning system 140 may input a current GNSS positioning solution to the system 100. As the positioning system 140 tracks the route of the aircraft, the positioning system 140 may input a future position based on the recent track. In addition, a flight plan may be stored within a memory 118 allowing the positioning system 140 and the memory 118 to cooperate to offer input of a future planned position to the system 100.

The memory 118 may be operably coupled with the FMS 116, and may provide the FMS 116 with updateable information (e.g., access to information) concerning altimetry requirements at a specific position. For example, the memory 118 may include a database of altimetry requirement throughout the world. At a first exemplary position, the transition altitude may be defined as 18,000 ft. MSL, while at a second exemplary position, the transition altitude may be defined as 4,000 ft. MSL. Transition levels may also change throughout the world. Some stations may require metric altimetry for safe local operation. For example, a traditional transition altitude in the US is 18,000 ft. MSL while a transition altitude in Moscow (UUEE) may be 1000 meters. A common transition level in the US is FL180 while in Amsterdam (EHAM) a common transitional level is FL40. The memory 118 stores an accurate and updatable database of each location and a rules set including the altimetry requirements at the location.

Flight displays 112 may provide an operator with any desired information for safe operation of the aircraft. For example, a primary flight display 112 may be one flight display requiring a display of the barometric altitude. The BARO setting may determine the altitude displayed on the primary flight display 112.

In association with the flight displays 112, a Crew Alerting System (CAS) 114 may operate to alert/notify the crew of a change in BARO setting. For example, as system 100 may change the BARO setting from 30.40 to 29.92, the CAS 114 may place a message on a flight display 112 indicating that a change has occurred and the current setting of the BARO altimeter. For example, "BARO SET 29.92" displayed on a flight display 112 may indicate to the pilot that the BARO setting is currently standard.

Since the system 100 is fully integrated, the system 100 may also (or solely) activate an aural status message indicating to the pilot that the BARO setting has been changed. For example, as the aircraft descends through the transition level, system 100 may announce "BARO SET 29.86" to indicate to the pilot the BARO has been set to 29.86 inHg.

In some embodiments, the system 100 may be incorporated within a descent checklist and climb checklist to ensure the system 100 has properly set the BARO setting. For example, as part of the descent checklist, a challenge may include "altimeters" wherein a proper response may include "set 29.86 inches" indicating a positive step to ensure the proper BARO setting to ensure altitude separation from traffic and surface obstacles.

Voice

Figure 2:
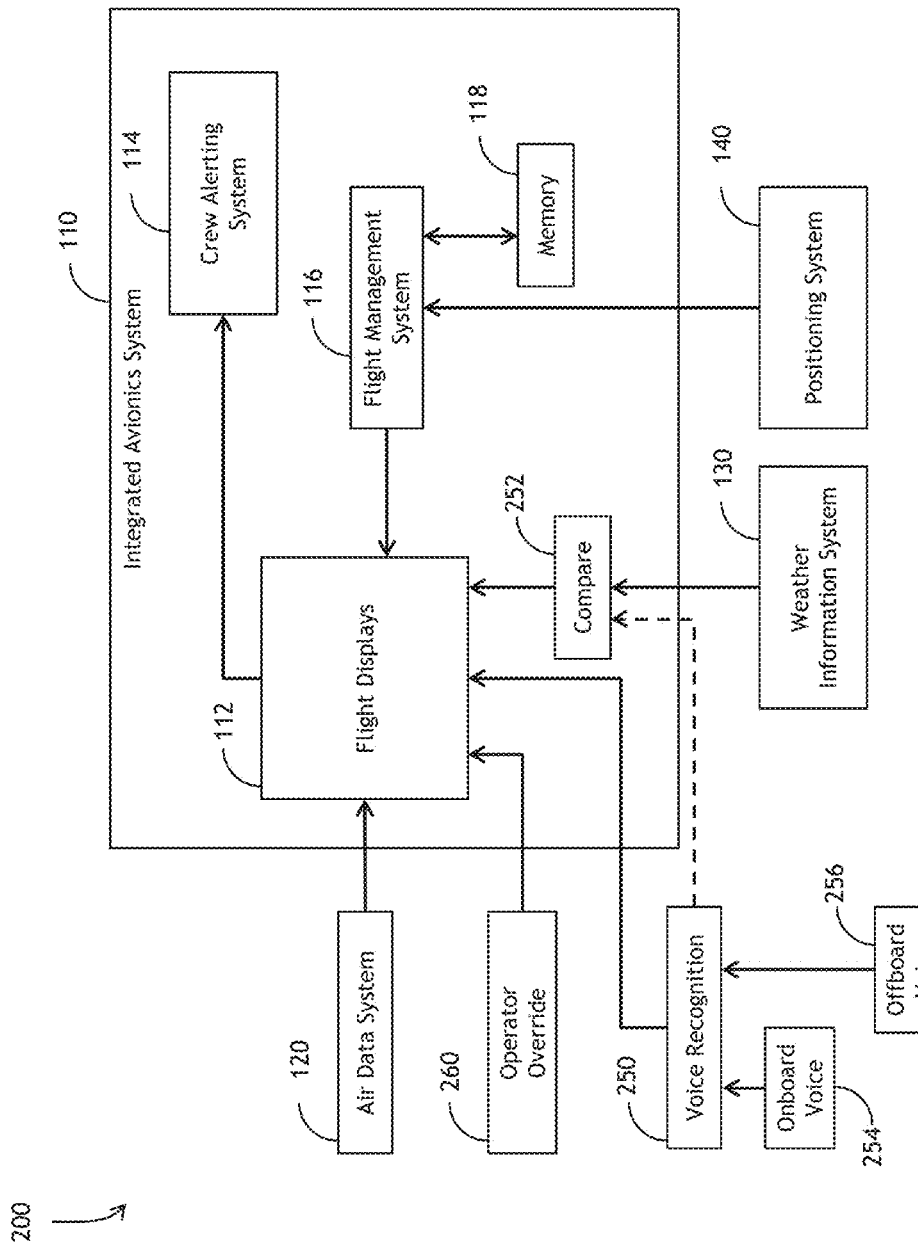
FIG. 2 is a diagram of an automated BARO system exemplary of an embodiment of the inventive concepts disclosed herein.

Referring to FIG. 2, a diagram of an automated BARO system exemplary of an embodiment of the inventive concepts disclosed herein concepts disclosed herein is shown. In one embodiment, the system 200 may operate by receiving an aural voice command input from an operator. Voice recognition 250 may operate to receive a voice command from a pilot and transmit the BARO altimeter setting to the flight displays 112. For example, a sound receiver within the voice recognition 250 may receive and digitize the spoken input for input to the system 200. In operation, a user may announce via onboard voice 254 "set BARO 2992," where the system 200 may receive the audio input from the voice recognition 250 and set the BARO setting to 29.92 inHg.

In one embodiment, the system 200 may combine METAR parsing capabilities with the voice recognition capabilities and compare 252 the METAR input to the voice input to determine any mis-compare between the two inputs. A mis-compare may result in an additional alert/notification presented to the crew via the CAS 114 and/or an aural warning.

As used herein, an operator may include an onboard crewmember actively piloting the aircraft as well as a remote operator controlling the vehicle from a remote site. Further, voice recognition of a verbal transmission from an onboard voice 254 source (e.g., a crewmember) as well as an offboard voice 256 source including an offboard controller as well as an offboard air traffic controller may be employed by the system 200 as the source of the altimetry information.

In one embodiment, an operator override 260 may be incorporated within the system 200. Operator may manually enter a BARO setting to the system 200 by physical action, such as by entering numbers into a user interface or input device for use by the system 200. For example, should a mis-compare be present where a METAR is reported as 30.27 and the operator/voice recognition 250 interprets a pilot voice as "30.47," the system 200 may report a mis-compare to the operator. In this case, the operator may manually input 30.27 to the system 200 for proper use.

System 200 may be especially useful in single operator/pilot operations. A single pilot must maintain awareness of a variety of factors to ensure safe and effective operation of the aircraft. Embodiments of the inventive concepts disclosed herein including a voice activated BARO setting may be an advantageous addition to a single piloted vehicle.

In addition, embodiments of the present invention may correct for metric altimetry in an aircraft designed primarily for English units. For example, an aircraft may be fitted with an altimeter configured for displaying barometric altitude in feet. When flying in an area using metric altimetry, pilots convert an assigned metric altitude assignment to an English altitude assignment to properly fly the assigned altitude. For example, an aircraft may be assigned an altitude of 10,100 meters. Pilots then execute a time-consuming and error-prone conversion to English units of 33,100 ft., and fly the 33,100 ft. assignment. In areas of high workload, this time consuming procedure may invite errors. The system 200 may receive a metric altitude assignment input and may convert and display a corrected altitude assignment configured for the English unit aircraft.

Embodiments of the inventive concepts disclosed herein may be automated by several means, including at least: 1) voice recognition application, and 2) extraction of BARO information from METAR/AWOS parsing. As an initial application for voice recognition, the pilot could repeat the altimeter setting with VOX button pressed (e.g. "SET BARO TWO NINER EIGHT TWO"). As an initial application for use of weather products, the system 200 may parse the METAR for the nearest airport (if below 18,000 ft.) and set BARO or upon proximity to the destination airport determine the current altimeter setting and automatically update BARO setting. The system 200 may initiate an associated aural or CAS message to notify the pilot what automation was completed or to confirm the BARO setting.

In addition, a touchscreen function may be implemented with some embodiments of the inventive concepts disclosed herein. The system 200 may receive from operator override 260 an input on the flight display 112 to indicate the operator has overridden the automated input of the system 200. Conversely, should the operator desire automated BARO setting, a touchscreen function may allow selection and de-selection of an auto BARO mode of operation of the system 200.

Parsing

Figure 3:
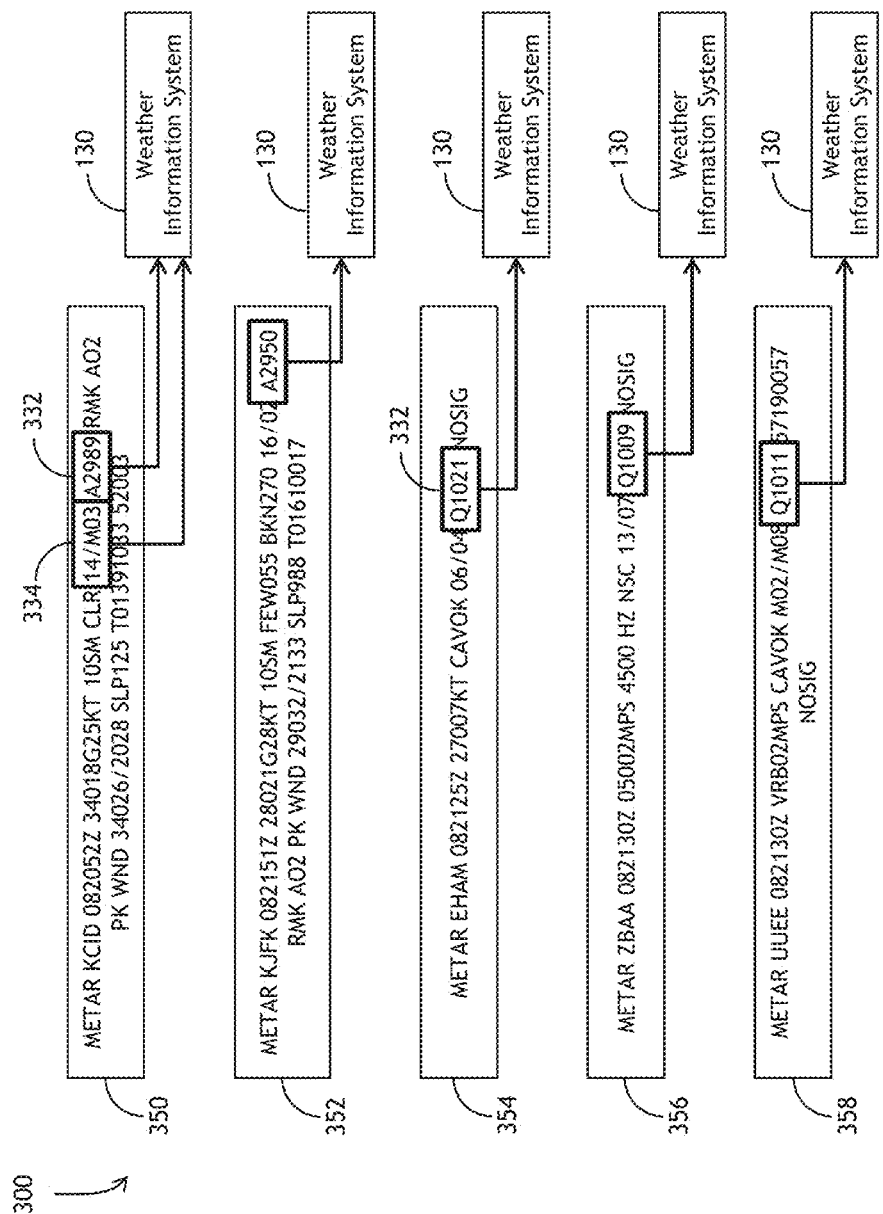
FIG. 3 is a diagram of an exemplary METAR format readable by an embodiment of the inventive concepts disclosed herein.

Referring to FIG. 3, a diagram of an exemplary METAR format readable by an embodiment of the inventive concepts disclosed herein concepts disclosed herein is shown. In operation, the system 100 receives the text of a METAR message, and determines the temperature and barometric pressure from the received METAR message. Any desired parsing techniques may be incorporated within the system 100 to retrieve desired parameters from the standard METAR message.

The system 100 may parse and extract for use a local barometric pressure 332. In the US, as indicated in the METAR report for Cedar Rapids (KCID) 350 and New York Kennedy (KJFK) 352, the local barometric pressure 332 may be indicated by an "A" followed by four characters. As indicated, KCID is reporting 29.89 inHg while KJFK reports 29.50 inHg. The four characters represent the BARO setting for use by the weather information system 130. Outside the US, the local barometric pressure 332 may be indicated by a Q character followed by four characters. For example, in Amsterdam (EHAM) 354, Beijing (ZBAA) 356, and Moscow (UUEE) 358, the local barometric pressure 332 is 1021 hectopascals (HPa) or millibars (MB), 1009 MB, and 1011 MB respectively.

The system 100 may also parse and extract for use the local temperature 334. As indicated in the METAR for KCID 350, a temperature report may include three characters, a forward slash, and three characters. The current reported temperature at KCID is 14 degrees Celsius (C) and the dew point is reported as negative (M) 03 degrees C. The local temperature 334 may be required for altimeter corrections when a non-standard temperature correction is required. For example, at −40 C, a 240 ft. difference exists between actual AGL altitude and barometric indicated altitude. The system 100 may apply a 240 ft. correction to the altitude indicated to the operator/pilot as well as present a notification via the CAS 114 indicating the correction has been applied.

The system 200 may perform location-based extraction of METAR data to ensure the correct local altimeter setting is used in the automatic BARO setting. The system 200 may use a proximal weather reporting station based on a plurality of factors including: 1) current position, 2) current altitude, 3) flight planned position and altitude. In one embodiment, the system 200 may reference or access the memory 118 to determine a nearest weather reporting station to current position from the positioning system 140. The system 200 may receive the current METAR from the nearest position and may use the altimeter setting from the current METAR for the displayed altitude.

Transition Level

Figure 4:
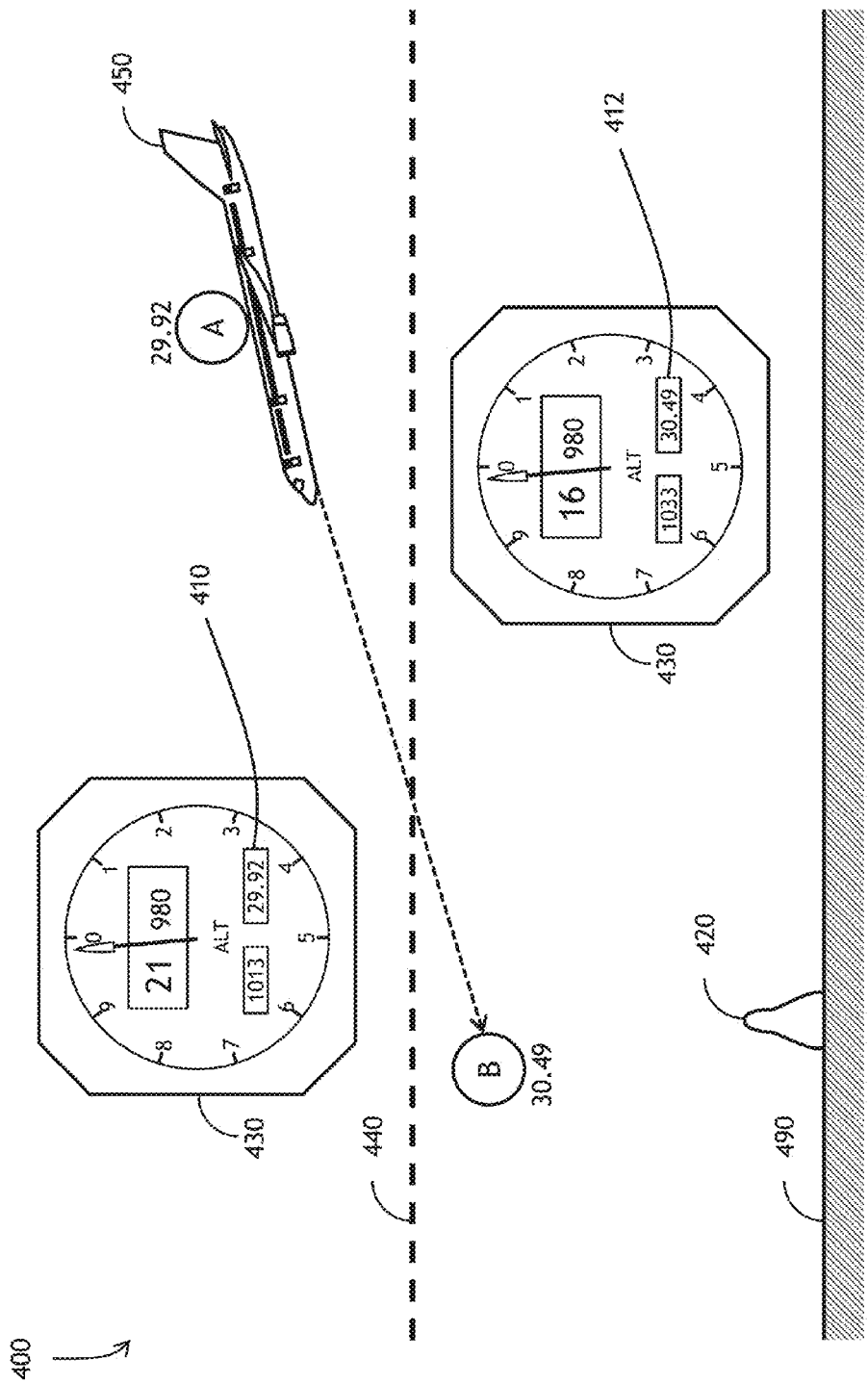
FIG. 4 is a diagram of an transition level crossing exemplary of one embodiment of the inventive concepts disclosed herein.

Referring to FIG. 4, a diagram of an transition level crossing exemplary of one embodiment of the inventive concepts disclosed herein concepts disclosed herein is shown. Above the transition level 440, the BARO setting 410 is required to be set at standard (e.g., 29.92 inHg) so each altimeter 430 may read similar altitudes and allow for accurate vertical separation between aircraft. As the aircraft 450 descends from point A above the transition level 440 to point B below the transition level 440, the pilot is required to fly an altitude based on the local BARO setting 412 (here 30.49 inHg) to ensure vertical separation from other aircraft and from the surface 490 or from other objects, aircraft, or terrain. The system 100 may receive a METAR message from the proximal station 420, and may extract and use the local BARO altimeter setting from the METAR message.

Transition Altitude

Figure 5:
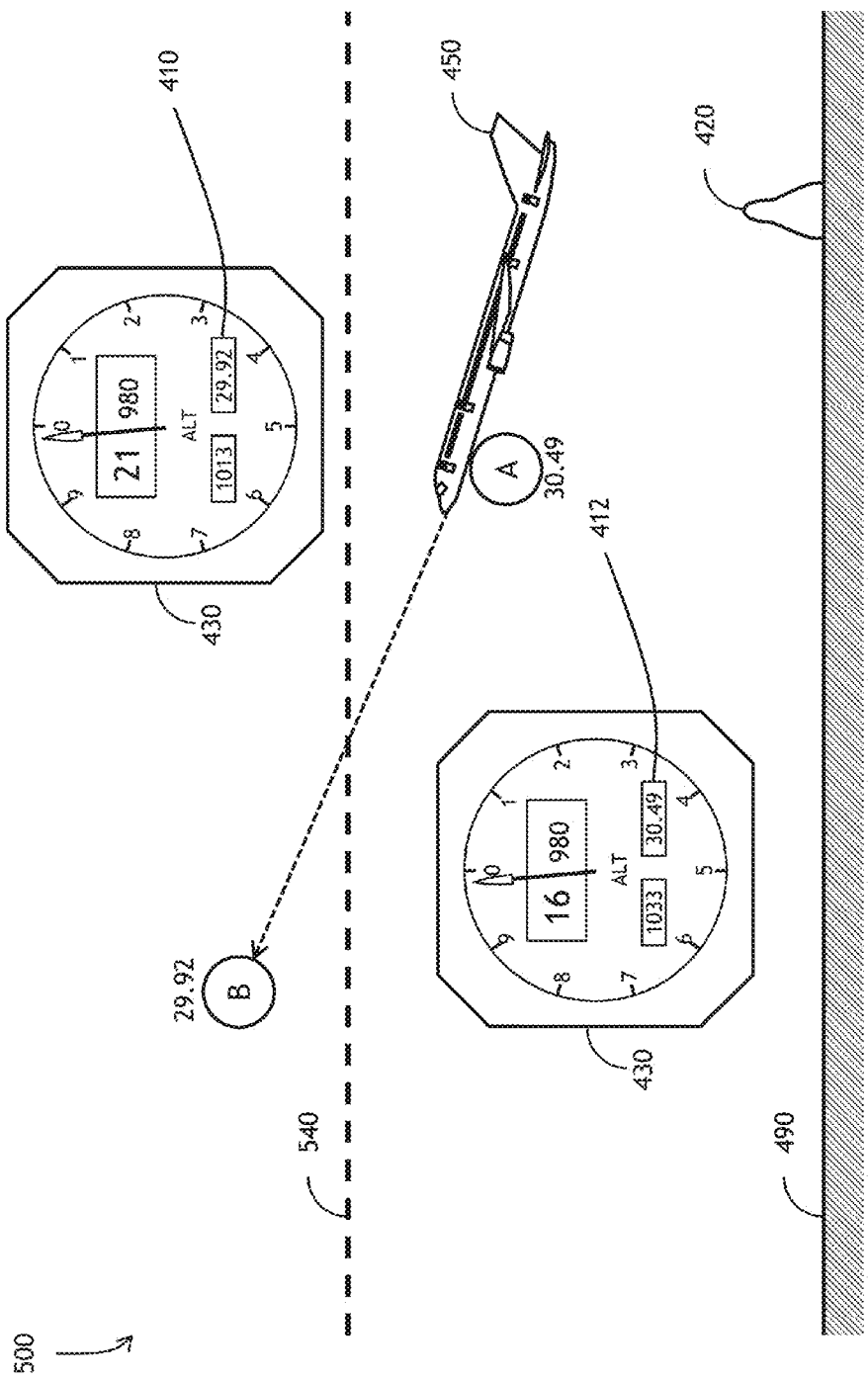
FIG. 5 is a diagram of a transition altitude crossing exemplary of one embodiment of the inventive concepts disclosed herein.

Referring to FIG. 5, a diagram of a transition altitude crossing exemplary of one embodiment of the inventive concepts disclosed herein is shown. Below the transition altitude 540, the pilot is required to fly an altitude based on the local BARO setting 412 (here 30.49 inHg received from proximal station 420) to ensure vertical separation from other aircraft and from the surface 490. As the aircraft 450 climbs from a point A below the transitional altitude 540 to a point B above the transition altitude 540, the BARO setting 410 is required to be set at standard (29.92 inHg) so each altimeter 430 above the transition altitude 540 may read altitudes based on similar settings allowing accurate vertical separation between aircraft. The system 100 may receive input from the air data system 120 indicating a climb above the transition altitude 540.

AWOS

Figure 6:
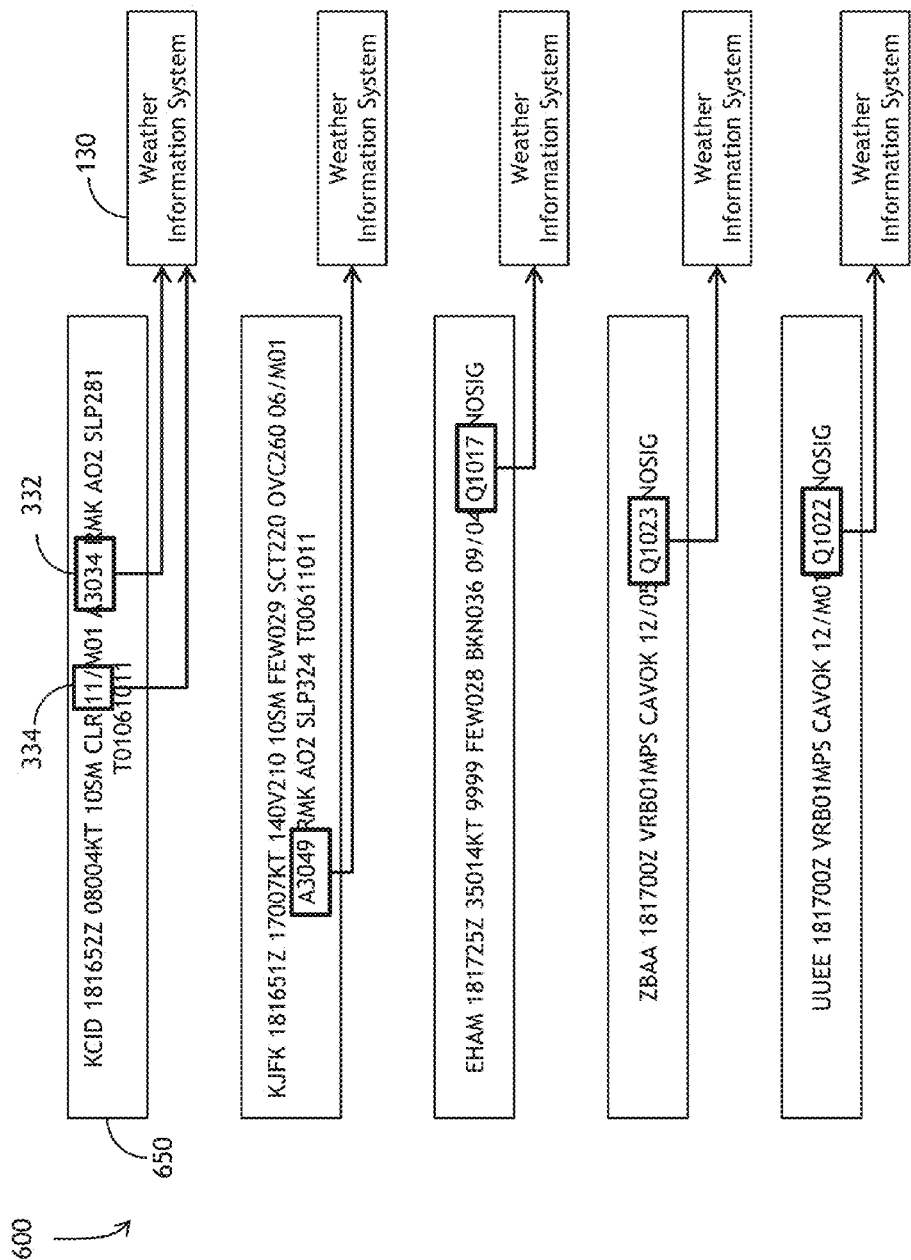
FIG. 6 is a diagram of exemplary AWOS format readable by one embodiment of the inventive concepts disclosed herein.

Referring to FIG. 6, a diagram of exemplary AWOS format readable by one embodiment of the inventive concepts disclosed herein concepts disclosed herein is shown. In one embodiment, the integrated avionics system 110 may receive AWOS/OBS data 650, enabling accurate altimetry based on this data format.

It is to be understood that additional formats of data may be supported and accessible by the system 100 allowing accurate altimetry based on the variable formats of received weather information. The integrated avionics system 110 may be configured to receive and extract a BARO setting and a temperature from a variety of available weather products, weather data sources, and formats.

Nearest

Figure 7:
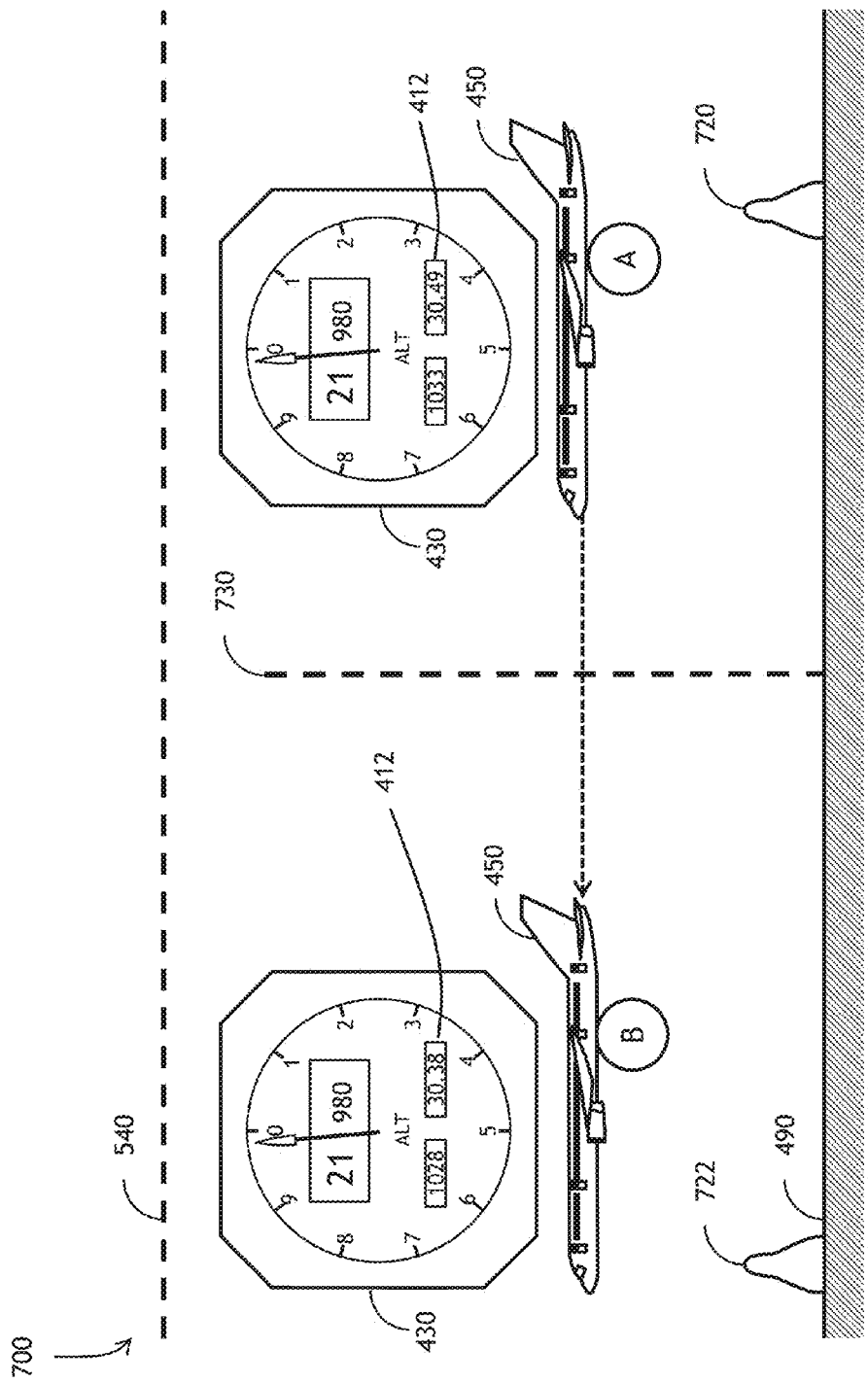
FIG. 7 is a diagram of local operations below a transition altitude exemplary of an embodiment of the inventive concepts disclosed herein.

Referring to FIG. 7, a diagram of local operations below a transition altitude exemplary of an embodiment of the inventive concepts disclosed herein concepts disclosed herein is shown. In a low altitude environment, as an aircraft 450 proceeds from a first location A to a second location B, accurate altimetry requires the BARO setting of the nearest weather reporting station. In this example, the aircraft 450 is flying near local station 720 using 30.49 inHg. As the aircraft 450 proceeds from point A to point B, local station 722 becomes the nearest station to the aircraft 450. The integrated avionics system 110 of the aircraft 450 may receive an input from positioning system 140 to determine a boundary 730 between local weather stations 720 and 722. The system 100 may set the BARO setting 412 to the local altimeter setting of the nearest station for accurate low altitude altimetry.

High Altitude Ops

Figure 8:
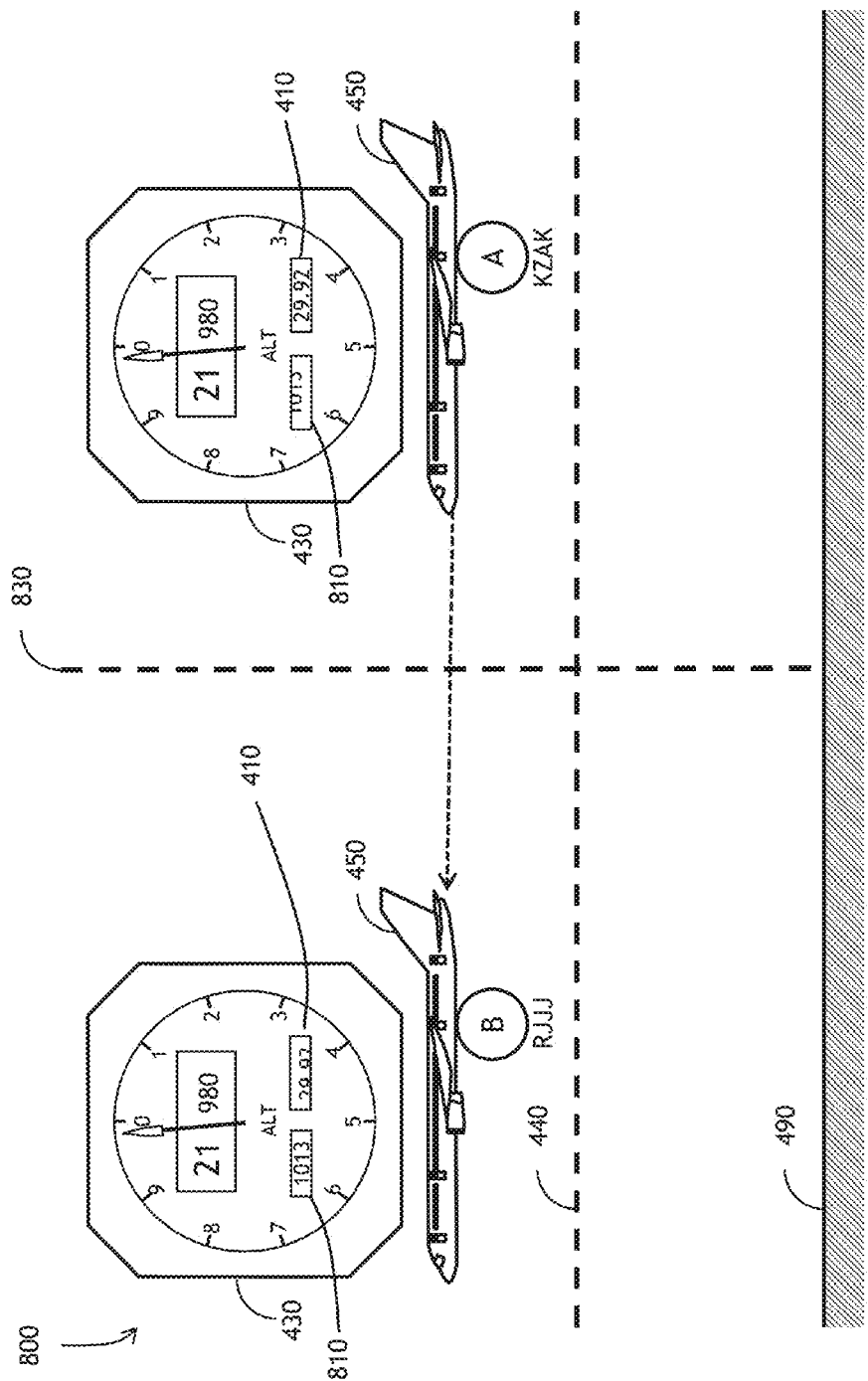
FIG. 8 is a diagram of high altitude operations above a transition level exemplary of an embodiment of the inventive concepts disclosed herein.

Referring to FIG. 8, a diagram of high altitude operations above a transition level exemplary of an embodiment of the inventive concepts disclosed herein concepts disclosed herein is shown. The system 100 may enable accurate altimetry above the transition level 440 in worldwide operations.

Occasionally, when crossing a boundary 830 between two Flight Information Regions (FIR), the standard BARO setting 410 may change. In these cases, operators may be required to begin using altimetry procedures of the newly entered FIR. The system 100 may operate to automatically select and display the BARO setting for the FIR of entry. For example, if an aircraft 450 is flying westbound from the Oakland Oceanic (KZAK) FIR A to the Fukuoka (RJJJ) FIR B, it may be required to discontinue using a standard BARO setting of 29.92 inHg and begin using a standard BARO setting of 1013 MB. The system 100 may accomplish this task based on the input from the positioning system 140, an input from the air data system 120, and a reference to the memory 118.

Operation

Figure 9:
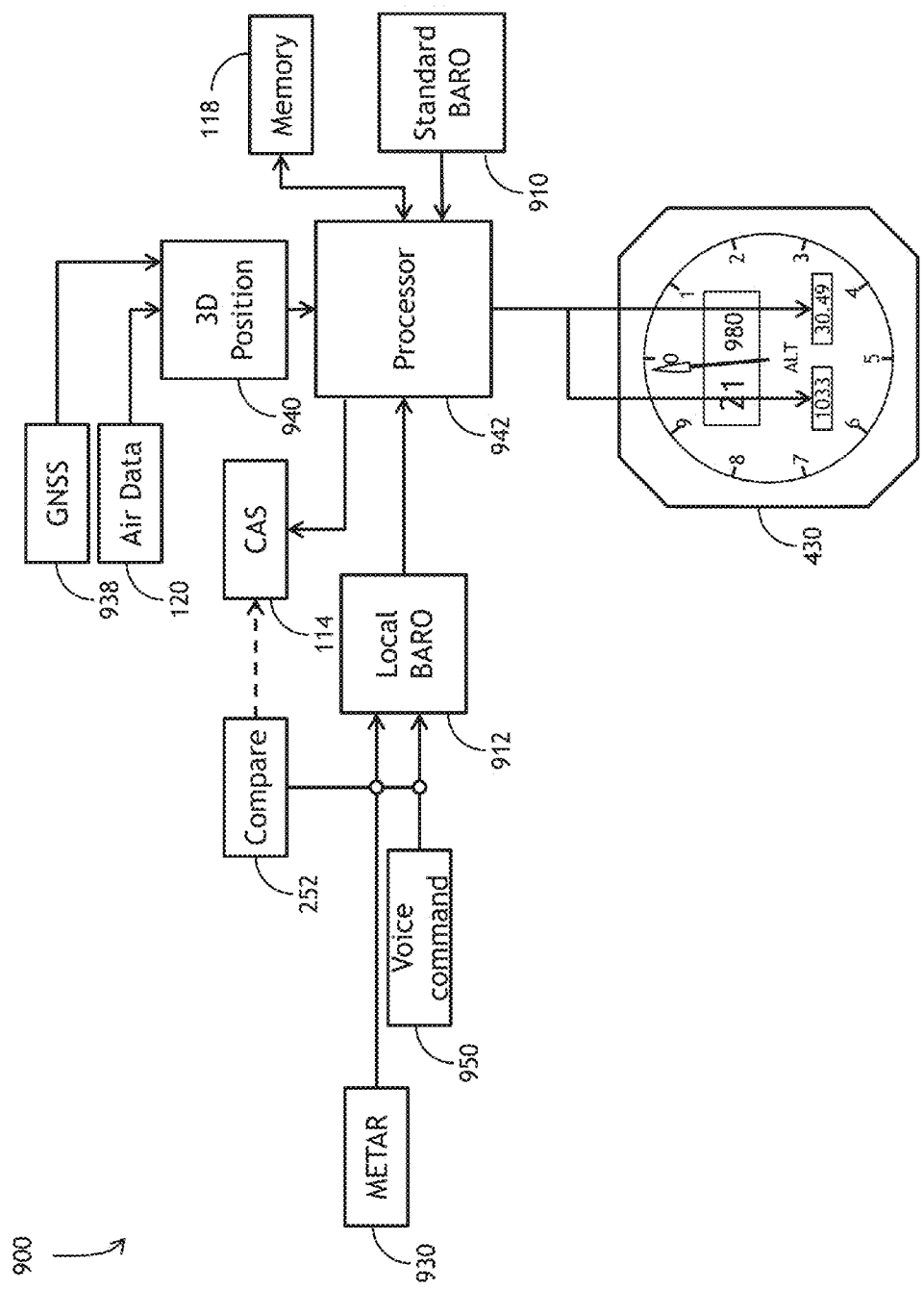
FIG. 9 is a flowchart of exemplary operation of an automatic BARO setting exemplary of an embodiment of the inventive concepts disclosed herein.

Referring to FIG. 9, a flowchart of exemplary operation of an automatic BARO setting exemplary of an embodiment of the inventive concepts disclosed herein concepts disclosed herein is shown. In some embodiments, the integrated avionics system 110 may operate on a basic level based on a 3D position input, voice command, and a METAR input. 3D position 940 may be based on a GNSS 938 input combined with an air data input 120 to determine the 3D position 940. A processor 942 may determine which BARO setting to use between a local BARO setting 912 and a standard BARO setting 910. As above, the local BARO setting 912 may be based on input from one of a local weather station METAR 930 and pilot voice commands 950 with a compare 252 function to reduce error possibility.

Should the processor 942 determine the aircraft is above the transition level, the processor 942 may command the standard BARO setting 910 based on the position. Conversely, should the processor 942 determine the aircraft is below the transition altitude, the processor 942 may command the local BARO setting 912 based on the METAR 930 and voice 950.

As the processor 942 commands the BARO setting, the processor 942 may command the CAS 114 to alert/notify the pilot of the change in altimetry as well as display the current BARO setting in the altitude window of an altimeter 430 (e.g., on a flight display 112).

Figure 10:
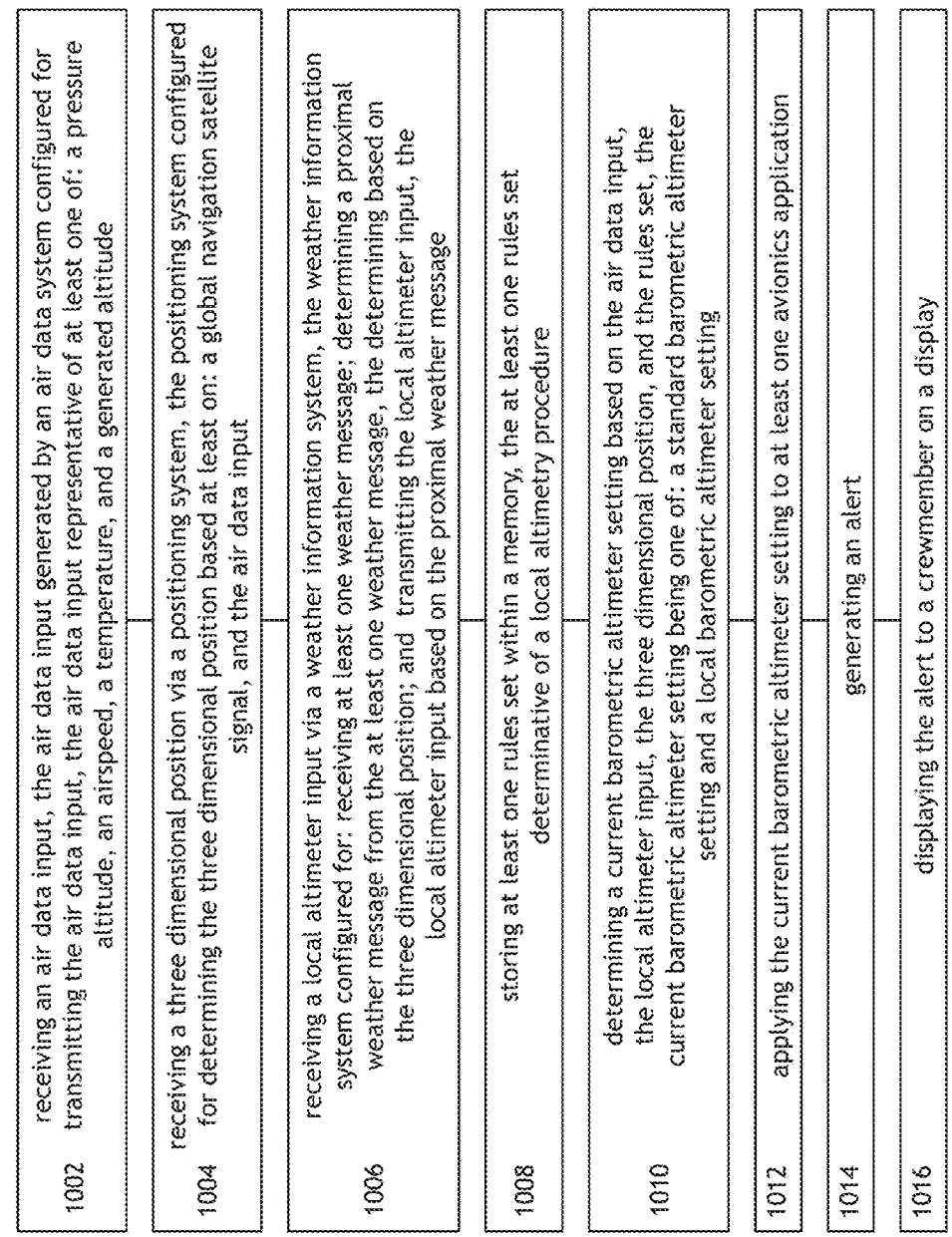
FIG. 10 is a flowchart of a method for automatic BARO setting exemplary of one embodiment of the inventive concepts disclosed herein.

Referring to FIG. 10, a flowchart of a method for automatic BARO setting exemplary of one embodiment of the inventive concepts disclosed herein concepts disclosed herein is shown. The method 1000 may have a step 1002 including receiving an air data input. The air data input may be generated by an air data system configured for transmitting the air data input, and may be representative of at least one of: a pressure altitude, an airspeed, a temperature, and a generated altitude. A step 1004 may include receiving a three dimensional position via a positioning system. The positioning system may be configured for determining the three dimensional position based at least on: a global navigation satellite signal, and the air data input. A step 1006 may include receiving a local altimeter input via a weather information system. The weather information system may be configured for: receiving at least one weather message; determining a proximal weather message from the at least one weather message, the determining based on the three dimensional position; and transmitting the local altimeter input, the local altimeter input based on the proximal weather message. A step 1008 may include storing at least one rules set within a memory, the at least one rules set determinative of a local altimetry procedure.

The method 1000 may also have a step 1010, which may include determining a current barometric altimeter setting based on the air data input, the local altimeter input, the three dimensional position, and the rules set, the current barometric altimeter setting being one of: a standard barometric altimeter setting and a local barometric altimeter setting, step 1012 may include applying the current barometric altimeter setting to at least one avionics application. A step 1014 may include generating an alert. A step 1016 may include displaying the alert to a crewmember on a display, such as the display 112.

As used herein, an aircraft is described as a preferred platform within which embodiments of the inventive concepts disclosed herein may function. However, operation of a plurality of vehicle types may benefit from embodiments of the inventive concepts disclosed herein. For example, an unmanned aircraft operating in a specific airspace may benefit from embodiments of the inventive concepts disclosed herein. Also, a ground based vehicle may be required to maintain a specific speed to maintain safe separation from additional vehicles. In some embodiments, the system 100 may receive a local performance parameter (speed) and apply the local performance parameter to a performance management system and display.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out various features of the inventive concepts disclosed herein as applied to various embodiments, it will be understood that various omissions and substitutions and changes in the form and details of the system illustrated may be made by those skilled in the art, without departing from the intent and broad scope of the inventive concepts disclosed herein. The foregoing description details certain embodiments of the inventive concepts disclosed herein. It will be appreciated, however, that no matter how detailed the foregoing appears, the inventive concepts disclosed herein may be embodied in other specific forms without departing from its spirit or broad scope. The described embodiments are to be considered in all respects only as illustrative and not restrictive, and the scope of the inventive concepts disclosed herein is, therefore, indicated by the appended claims rather than by the foregoing description. All changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Skilled artisans will recognize a positioning signal may be received from a plurality of positioning satellite vehicle types and on a plurality of frequencies. As used herein, a GNSS signal may include any positioning and timing signal received from any satellite vehicle and network. A non-exclusive list of currently available satellite positioning system may include a Global Positioning System (GPS), a Global Navigation Satellite System (GNSS), a Global Navigation Satellite System (GLONASS), a Galileo system, a Beidou system, a COMPASS system, an India Regional Satellite System (IRNSS), and a Quasi-Zenith Satellite System (QZSS).

Although a user may be shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An integrated system for automated barometric altimeter setting, comprising:
   an air data system integrated within the integrated system, the air data system configured for transmitting an air data input, the air data input representative of at least one of: a pressure altitude, an airspeed, a temperature, and a generated altitude;
   a positioning system integrated within the integrated system, the positioning system configured for determining a three dimensional position based at least on: a global navigation satellite signal and the air data input;
   a weather information system integrated within the integrated system, the weather information system configured for:
      receiving at least one weather message;
      determining a proximal weather message from the at least one weather message, the determining based on the three dimensional position; and
      transmitting a local altimeter input, the local altimeter input based on the proximal weather message;
   a memory configured for storing at least one rules set, the at least one rules set determinative of a local altimetry procedure;
   an integrated avionics system operably coupled with the air data system, the positioning system, the weather information system, and the memory, the integrated avionics system configured for:
      receiving the air data input;
      receiving the local altimeter input;
      receiving the three dimensional position; and
      determining a current barometric altimeter setting based on the air data input, the local altimeter input, the three dimensional position, and the rules set, the current barometric altimeter setting being one of: a standard barometric altimeter setting and a local barometric altimeter setting;
      applying the current barometric altimeter setting to at least one avionics application; and
      generating an alert; and
   transmitting the alert to a crew alerting system configured for presenting the alert to a crewmember.

2. The integrated system for automated barometric altimeter setting of claim 1, wherein the current barometric altimeter setting is further based on one of: a voice command received from an operator, a voice transmission received from an offboard source, and a signal received via a data link.

3. The integrated system for automated barometric altimeter setting of claim 1, wherein the air data input is received via one of: an onboard pitot-static system, and a signal received via a data link.

4. The integrated system for automated barometric altimeter setting of claim 1, wherein the weather message is one of: a METAR message, an hourly observation message, and an automated weather observation reporting system message.

5. The integrated system for automated barometric altimeter setting of claim 1, wherein the positioning system is one of: a global navigation satellite system, and an onboard inertial system.

6. The integrated system for automated barometric altimeter setting of claim 1, wherein the current barometric altimeter setting is established via an operator override executed by an operator.

7. The integrated system for automated barometric altimeter setting of claim 1, wherein the at least one avionics application is one of: a primary flight display, an altimeter display, and an altitude alerting system.

8. A method for automated barometric altimetry, comprising:
   receiving an air data input, the air data input generated by an air data system configured for transmitting the air data input, the air data input representative of at least one of: a pressure altitude, an airspeed, a temperature, and a generated altitude;
   receiving a three dimensional position via a positioning system, the positioning system configured for determining the three dimensional position based at least on: a global navigation satellite signal, and the air data input;
   receiving a local altimeter input via a weather information system, the weather information system configured for:
      receiving at least one weather message;
      determining a proximal weather message from the at least one weather message, the determining based on the three dimensional position; and
      transmitting the local altimeter input, the local altimeter input based on the proximal weather message;
   storing at least one rules set within a memory, the at least one rules set determinative of a local altimetry procedure;
   determining a current barometric altimeter setting based on the air data input, the local altimeter input, the three dimensional position, and the rules set, the current barometric altimeter setting being one of: a standard barometric altimeter setting and a local barometric altimeter setting;
   applying the current barometric altimeter setting to at least one avionics application;
   generating an alert; and
   displaying the alert to a crewmember on a display.

9. The method for automated barometric altimetry of claim 8, wherein the current barometric altimeter setting is further based on one of: a voice command received from an operator, a voice transmission received from an offboard source, and a signal received via a data link.

10. The method for automated barometric altimetry of claim 8, wherein the air data input is received via one of: an onboard pitot-static system, and a signal received via a data link.

11. The method for automated barometric altimetry of claim 8, wherein the weather message is one of: a METAR, an hourly observation message, and an automated weather observation reporting system message.

12. The method for automated barometric altimetry of claim 8, wherein the positioning system is one of: a global navigation satellite system, and an onboard inertial system.

13. The method for automated barometric altimetry of claim 8, wherein the current barometric altimeter setting is established via an operator override executed by an operator.

14. The method for automated barometric altimetry of claim 8, wherein the at least one avionics application is one of: a primary flight display, an altimeter display, and an altitude alerting system.

15. A computer readable medium having non-transitory computer readable program code embodied therein for automated barometric altimetry, the computer readable program code comprising instructions which, when executed by a computer device or processor, perform and direct the steps of:
   receiving an air data input, the air data input generated by an air data system configured for transmitting the air data input, the air data input representative of at least one of: a pressure altitude, an airspeed, a temperature, and a generated altitude;
   receiving a three dimensional position via a positioning system, the positioning system configured for determining the three dimensional position based at least on: a global navigation satellite signal, and the air data input;

receiving a local altimeter input via a weather information system, the weather information system configured for:
   receiving at least one weather message;
   determining a proximal weather message from the at least one weather message, the determining based on the three dimensional position; and
   transmitting the local altimeter input, the local altimeter input based on the proximal weather message;

storing at least one rules set within a memory, the at least one rules set determinative of a local altimetry procedure;

determining a current barometric altimeter setting based on the air data input, the local altimeter input, the three dimensional position, and the rules set, the current barometric altimeter setting being one of: a standard barometric altimeter setting and a local barometric altimeter setting;

applying the current barometric altimeter setting to at least one avionics application;

generating an alert; and displaying the alert to a crewmember on a display.

16. A method for automated setting of a position based performance parameter, comprising:
   receiving at least one three dimensional position, the at least one three dimensional position being one of: a geographical three dimensional position, an expected geographical three dimensional position, an altitude, and a geographic boundary;
   receiving at least one local position based performance parameter, the at least one local position based performance parameter applicable proximal to the at least one three dimensional position, the at least one local position based performance parameter generated to ensure separation between a first vehicle and at least one of: a second vehicle, an obstacle, and a terrain proximal to the first vehicle, each of the first and second vehicle proximal to the at least one three dimensional position;
   receiving a first vehicle current position;
   determining a correlation between the first vehicle current position and the at least one three dimensional position;
   setting the position based performance parameter based on the correlation; and
   displaying the set position based performance parameter to an operator of the first vehicle.

17. The method for automated setting of a position based performance parameter of claim 16, wherein the position based performance parameter is set based on one of: a voice command received from an operator, a signal received via a data link, and an altimeter setting received from an air traffic controller.

18. The method for automated setting of a position based performance parameter of claim 16, wherein the at least one local position based performance parameter is one of: a speed, a configuration, a communications procedure, and a change in performance.

19. The method for automated setting of a position based performance parameter of claim 16, wherein the at least one three dimensional position is based on one of: a global navigation satellite system, and an onboard inertial system.

20. The method for automated setting of a position based performance parameter of claim 16, wherein the position based performance parameter is established via an operator override executed by an operator.

* * * * *